(12) United States Patent
Helicke et al.

(10) Patent No.: US 7,708,923 B1
(45) Date of Patent: May 4, 2010

(54) PROCESS OF MOLDING A COUPLING FOR INTERCONNECTING TUBES

(75) Inventors: Albert H. Helicke, Odessa, FL (US); Dennis M. Smith, St. Petersburg, FL (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 1039 days.

(21) Appl. No.: 11/060,881

(22) Filed: Feb. 18, 2005

Related U.S. Application Data (60) Provisional application No. 60/546,584, filed on Feb. 19, 2004, now abandoned.

(51) Int. Cl.
*B29C 45/14* (2006.01)
(52) U.S. Cl. .................. 264/261; 264/275; 264/277; 264/334; 264/335
(58) Field of Classification Search .............. None
See application file for complete search history.

(56) References Cited

U.S. PATENT DOCUMENTS

| | | | |
|---|---|---|---|
| 2,127,903 A * | 8/1938 | Bowen .................. 606/154 |
| 4,076,282 A | 2/1978 | Scott, Jr. et al. |
| 4,615,114 A | 10/1986 | Jones et al. |
| 4,815,769 A | 3/1989 | Hopperdietzel |
| 4,902,419 A | 2/1990 | Shibata et al. |
| 4,903,998 A | 2/1990 | Stanley |
| 4,997,213 A | 3/1991 | Traner et al. |
| 5,299,839 A | 4/1994 | Mogavero |
| 5,302,336 A | 4/1994 | Hartel et al. |
| 5,356,587 A | 10/1994 | Mitsui et al. |
| 5,447,341 A | 9/1995 | Hartel et al. |
| 5,568,949 A | 10/1996 | Andre |
| 5,773,036 A | 6/1998 | Zimmer et al. |
| 5,895,695 A | 4/1999 | Rowley |
| 6,290,265 B1 | 9/2001 | Warburton-Pitt et al. |
| 6,315,331 B1 | 11/2001 | Krause et al. |
| 6,432,345 B1 | 8/2002 | Warburton-Pitt |
| 6,497,836 B2 | 12/2002 | Krause et al. |
| 6,635,214 B2 * | 10/2003 | Rapacki et al. ............. 264/250 |
| 2004/0164453 A1 | 8/2004 | Warburton-Pitt |
| 2004/0164555 A1 | 8/2004 | Warburton-Pitt |

* cited by examiner

*Primary Examiner*—Edmund H. Lee
(74) *Attorney, Agent, or Firm*—Larson Newman & Abel, LLP (57) ABSTRACT

A coupling and a process of molding the coupling is disclosed for interconnecting a primary and a secondary tube. The process comprises the steps of inserting a primary core pin into the primary tube. A secondary core pin is inserted into the second tube to abut with the primary core pin. The assembled tubes and core pins are placed within a mold cavity and a thermoplastic material is injected for forming the coupling. The coupling and the interconnected tubes are removed from the mold cavity. The secondary core pin is disengaged from the secondary core pin to be removed by passing the secondary core pin through the secondary tube. The primary core pin is removed by passing the secondary core pin through the primary tube. The coupling forms a smooth interconnection of the inner cross-sections of the first and second tubes.

19 Claims, 9 Drawing Sheets

PROCESS OF MOLDING A COUPLING FOR INTERCONNECTING TUBES

CROSS-REFERENCE TO RELATED APPLICATIONS

This application claims benefit of U.S. Patent Provisional application Ser. No. 60/546,584 filed Feb. 19, 2004, now abandoned. All subject matter set forth in provisional application Ser. No. 60/546,584 is hereby incorporated by reference into the present application as if fully set forth herein.

BACKGROUND OF THE INVENTION

1. Field of the Invention

This invention relates to couplings and more particularly to a new and improved coupling for interconnecting plural tubes and a method of forming the coupling.

2. Background of the Invention

Apparatuses and processes have been well known in the art throughout history for moldings a new object. In primitive molding processes, a mold cavity was formed within a mold to form a new object. The mold cavity was cut into the mold in the shape of the new object. A liquefied material was poured into a mold cavity to solidify within the mold cavity. After the solidification of the liquefied material, the mold was opened to release the solidification material formed in the shape of the new object.

In the event one desired to reproduce an old object, a mold was formed about the old object. The mold was separated into two or more pieces to release the old object leaving a mold cavity in the shape of the old object. The liquefied material was poured into a mold cavity to solidify within the mold cavity. Upon the opening of the mold, the reproduction of the old object was released from the mold. If the carefully opened or formed in two pieces, then the mold could be reused multiple times for producing multiple reproduction.

In the event the reproduction required a hollow portion, a core would have to be placed within the mold cavity to form the hollow portion upon filling the mold cavity with the liquefied material. Upon opening of the mold, the core in many instances would interfere with the removal of the reproduction from the mold cavity.

Although the art of molding object has progressed substantially from primitive times, process of removing the core from a mold cavity after formation of the reproduction is still a problem in the molding art. In many modern molding processes, a mold is formed with a core pin extending into the mold cavity during the mold process. After completion of the molding process, the core pins is withdrawn from the mold cavity prior to opening the mold. The withdrawal of the mold pin enables the reproduction to be released from the mold cavity.

In some instances, it is impossible to withdraw a core pin from a mold cavity prior to opening the mold. In these instances, the problem of removing the reproduction from the mold cavity after the molding process is still a problem in the molding art. The following U.S. patents have attempted to solve the problem heretofore stated.

U.S. Pat. No. 4,076,282 to J. N. Scott et al. discloses a molded article comprising a hollow body of a crosslinked polymer rotationally molded around a section of at least one piece of non-crosslinked conduit. The conduits protrude from the hollow body, made by attaching the conduits of non-crosslinked material at the desired location to the mold with the section being located inside a heated section of the mold so that the crosslinkable polymer during a rotational molding process is fused and crosslinked inside of the mold and around and in tight welding-type connection with the section. The remainders of the pieces of uncrosslinked polymer are heat-insulated to avoid deformation or collapsing of these pieces.

U.S. Pat. No. 4,615,114 to H. T. Jones et al. discloses a molded buswork and method of manufacturing the buswork, including a conductive T-shaped member having openings at the ends and insulated cables having the insulation at the ends of the cables stripped away to expose the ends of the conductors. An individual exposed conductor is crimped in each open end of the conductive member. The conductive member is supported in a cavity mold by the cables. The cavity mold is filled with a thermal-setting silicone rubber and the silicone rubber curing in the mold encapsulates and bonds to the conductive member, the exposed ends of the conductors, and the insulation on each cable.

U.S. Pat. No. 4,815,769 to S. Hopperdietzel discloses a connector for heatable hoses and a heatable hose assembly for transporting fluids. The heatable hose assembly includes at least one heatable hose having a hose wall which defines therein a longitudinal cavity, a first end, and at least one heating wire having a first portion embedded in the hose wall and extending longitudinally therein. A second portion which is an exposed length having a contacting portion extends from the first portion and a connecting portion extends from the contacting portion. A heat-insulated connector comprises a connecting element and a heating wire connecting member. A casing, wherein the connecting element is made of a heat conductive material has at least one hose insertion end inserted into the longitudinal cavity of the first end and at least one projecting portion extending outwardly from at least one hose insertion end. The contacting portion is positioned in contact with the at least one projecting portion. The connecting portion is connected to the heating wire connecting member. The heating wire connecting member has a first portion and a second portion. The casing is made of an insulating material positioned around the connecting element, the first portion of the heating wire connecting member and a portion of the first end to encase same and prevent release thereof. The second portion of the heating wire connects member projects outwardly through the casing.

U.S. Pat. No. 4,902,419 to Y. Shibata et al. discloses a method for fastening soft porous polymer tubes into a fastening seat. Remolding the tube ends by compression removes porosity before insertion into the seat or pressure insertion of a hard, strong tube into each porous tube after insertion into the fastening seat to compress it. An adhesive is used to fill the seat to hold the tubes in place.

U.S. Pat. No. 4,903,998 to J. H. Stanley discloses a branched hose construction containing a rigid insert having at least three legs. There is a plurality of hoses with the number of hoses being equal to the number of legs of the insert. Each hose has one end fitted over a leg of the insert. A securing means secures the hose to the leg. A molded saddle encapsulates the rigid insert and the junction of the hoses.

U.S. Pat. No. 4,997,213 to D. Traner et al. discloses a method of assembling a connection for branched radiator coolant hose in which the hoses to be connected are adhered onto the ends of a T-shaped connector. Then a capsule of rubber is molded around the area of the connection and cured to form a unitary and integral connection.

U.S. Pat. No. 5,299,839 to C. Mogavero discloses a connection for flexible tubes including a rigid tubular insert with at least two ends onto which the ends of flexible tubes are force-fitted. A cover of plastics material is moulded over the tubular insert and over the ends of the tubes. At least one respective integral, circular sealing lip projects from the internal surface of the end of each tube and engages the external surface of the corresponding end of the insert.

U.S. Pat. No. 5,302,336 to V. Hartel et al. discloses a method for producing molded hose branches of rubber. A molded hose branch produced according to the method, includes slipping completely vulcanized rubber hose lengths with ends onto free ends of a plastic tubing branching piece for forming an assembly. Placing the assembly into a mold, and injection molding a thermoplastic rubber material in the form of a blended mixture of polypropylene and EPDM around the assembly joins the thermoplastic material to the rubber hose lengths for forming a sleeve around the rubber hose lengths and free parts of the tubing branching piece between the ends of the rubber hose lengths.

U.S. Pat. No. 5,356,587 to K. Mitsui et al. discloses a process for producing a hose having a connecting portion including the steps of a connecting step, and a molding step. In the molding step, a dividable mold is employed in which a first sealing member and a second sealing member are retained so as to form a sealing ring. The sealing ring firmly retains a hose in the mold without pinching and damaging it. Further, the mating surfaces of the first sealing member and the second sealing member are disposed so as to deviate from the center of the sealing ring. Furthermore, a chucking member adapted for locally pressing the hose is disposed adjacent to the sealing ring. Moreover, a recessing portion communicating with the cavity of the mold by way of a narrow passage is formed and the first minimum pressure of the molding material, enabling to pass through the narrow passage, is set less than the sealing pressure exerted between the sealing ring and the hose and is set more than the second minimum pressure thereof, to inhibit the short shot failures.

U.S. Pat. No. 5,447,341 to V. Hartel et al. discloses a molded hose branch of rubber including an assembly formed by slipping completely vulcanized rubber hose lengths with ends onto free ends of a plastic tubing branching piece. The assembly is placed into a mold, and a thermoplastic material, for instance a blended mixture of polypropylene and EPDM, is injection molded around the assembly so as to join the thermoplastic material to the rubber hose lengths. This results in a sleeve around the rubber hose lengths and free parts of the tubing branching piece between the ends of the rubber hose lengths.

U.S. Pat. No. 5,568,949 to M. Andre discloses tubes or pipes engaged on an insert and are fixed thereon in sealed manner by molding a plastics material at least over those zones of said tubes or pipes that co-operate with said insert. The plastics material is molded so as to form a cellular material whose expansion is performed so as to give rise to compression forces on said tubes or pipes that ensure that said tubes or pipes are fixed or sealed onto the insert.

U.S. Pat. No. 5,773,036 to D. Zimmer et al. discloses a device useful for extrusion-coating a tube. The connection zone of a tubular composite body, which zone has to be sealed, with rubber or plastic. The device is particularly useful for extrusion-coating a hose connection, which includes a connection pipe made of rubber or plastic, onto which the rubber or plastic hose section is pushed. It is essential that the device, in addition to the fixed molding tool contour with injection nozzles, has at least one, in particular at least two slide clamps per circumferential unit. This enables the sealing surface of the slide clamp substantially to have the contour of the surface of the article directly opposing it in the sealing zone.

U.S. Pat. No. 5,895,695 to W. W. Rowley discloses an invention described herein pertaining generally to a crosslinked plumbing tube which has at least one overmolded end (e.g. nose cone or nut) attached thereto. In one aspect of this invention, the tube is more rigid than the overmolded component while in another aspect of the invention, the tube is more flexible than the overmolded component. In either embodiment of this invention, the tube provides an all-plastic waterway for a contained liquid or gas to flow through. The degree of flexibility is controlled independently controlling the density of the tube polymer and the overmolding polymer. In one aspect of the invention, the tube and the overmolding polymer are both partially crosslinked to independent first degrees prior to the overmolding process. Subsequent to the overmolding process, the crosslinking is continued to a higher degree for both polymers.

U.S. Pat. No. 6,290,265 to S. R. Warburton-Pitt et al. discloses a connector and tubing assembly including a multi-lumen molded connector having at least three flexible tubes also molded into the connector. The connector may be "Y" shaped and include three flexible tubes. A process of making the connector and tubing assembly involves forming a first part of the connector with two tubes molded therein and then removing an internal mold member prior to molding the final connector portion and third tube in place.

U.S. Pat. No. 6,315,331 to K. M. Krause et al. discloses molded hose joint assemblies, e.g., connections, branched hoses and bleeding devices for fluid circuits. Such assemblies for use in automotive and industrial coolant circuit assemblies, comprise a reduced amount of molded outer covering element over prior art designs. The covering element substantially encapsulates the connection points of generally flexible hose ends to generally rigid inner connection members. The outer covering element forms a unitary mass or interconnecting rings about at least two such hose connection points. Flexible manufacturing techniques for producing such assemblies are provided.

U.S. Pat. No. 6,432,345 to S. R. Warburton-Pitt discloses a method for forming, in a single step, a silicone manifold interconnecting a plurality of silicone tubes by providing a silicone insert piece having a network of interior channels dimensioned the same as the silicone tube interiors. Solid non-silicone plugs are inserted into the insert piece and the ends of the silicone tubes and the resulting assembly is placed in a mold cavity. Liquid silicone is added to the mold cavity and is then heated and cured to form the desired manifold interconnecting the tubes. The manifold is then removed from the mold and a source of pressurized air is used to blow out the plugs.

U.S. Pat. No. 6,497,836 to K. M. Krause et al. discloses molded hose joint assemblies, e.g., connections, branched hoses and bleeding devices for fluid circuits, and especially such assemblies for use in automotive and industrial coolant circuit assemblies. The assemblies comprise a reduced amount of molded outer covering element over prior art designs. The covering element substantially encapsulates the connection points of generally flexible hose ends to generally rigid inner connection members. The outer covering element forms a unitary mass or interconnecting rings about at least two such hose connection points. Flexible manufacturing techniques for producing such assemblies are provided.

Therefore, it is an object of the present invention to provide an improved process of molding a coupling that overcomes the problems of the molding processes set forth above Another object of this invention is to provide an improved process of molding a coupling that is capable of removing a core pin after formation of the coupling.

Another object of this invention is to provide an improved process of molding a coupling that is capable of forming new and improved coupling configurations.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to an improved apparatus and a process of molding a coupling for interconnecting a primary and a secondary tube, comprising the steps of inserting a primary core pin into an end of the primary tube. A secondary core pin is inserted into an end of the second tube to abut with the primary core pin. The assembled tubes and core pins are placed within a mold cavity and a thermoplastic material is injected for forming the coupling interconnecting the secondary and second tubes. The coupling and the tubes are removed from the mold cavity. The secondary core pin is disengaged from the secondary core pin and is removed by passing the secondary core pin through the secondary tube. The primary core pin is removed by passing the secondary core pin through the primary tube.

In a more specific example of the invention, the invention sets forth the process of molding a coupling for interconnecting a first, a second and a third tube. The process comprises inserting a primary core pin into an end of the first and the second tubes. A secondary core pin is inserted into an end of the third tube to engage with an aperture in the primary core pin. The assembled tubes and core pins are placed into a mold cavity and a thermoplastic material is injected a into the mold cavity for forming the coupling interconnecting the first, second and third tubes. The coupling and the first, second and third tubes are removed from the mold cavity. The secondary core pin is disengaged from the mating aperture in the primary core pin and is removed by passing the secondary core pin through the third tube. The primary core pin is removed by passing the primary core pin through one of the first and second tubes.

In a still a more specific example of the invention, the invention, a first end of the secondary core pin is threaded into a mating threaded aperture in the primary core pin. An extractor is threaded into a second end of the secondary core pin to unthread the first end of the secondary core pin from the mating threaded aperture to remove the secondary core pin through the third tube.

The invention is also incorporated into a coupling comprising a first and a second tube defining a first and a second inner cross-section. A coupling is molded about an end of each of the first and second tubes with the coupling forming a smooth interconnection of the inner cross-sections of the first and second tubes. In one example of the invention, the coupling is formed by injected thermoplastic elastomers.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
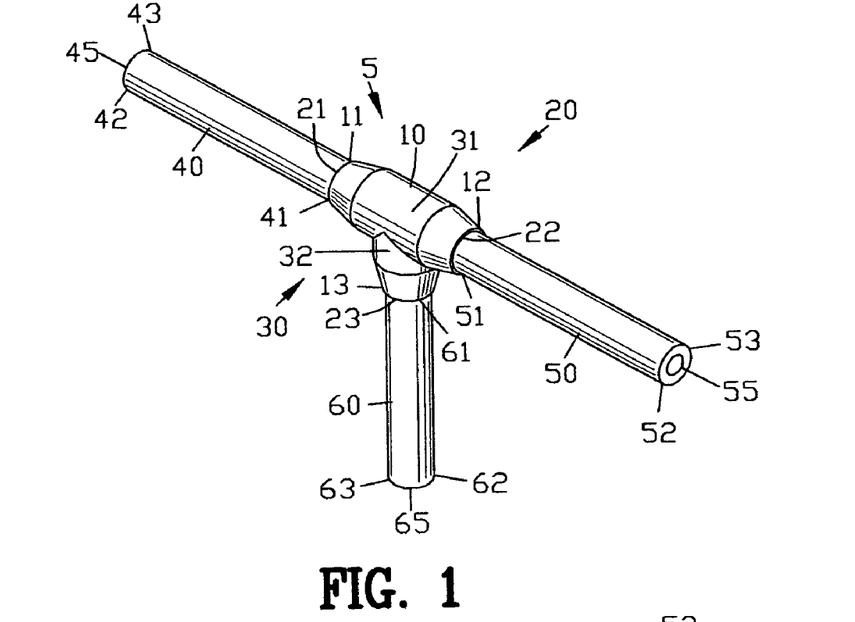
FIG. 1 is a front isometric view of a first embodiment of a coupling of the present invention
Figure 2:
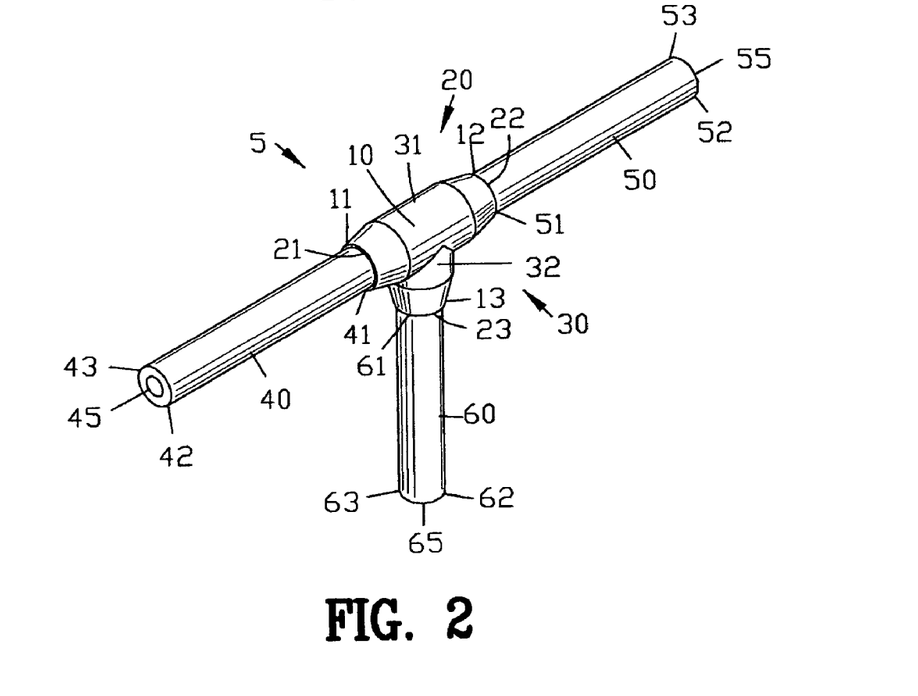
FIG. 2 is a rear isometric view of the coupling of FIG. 1.

FIGS. 1 and 2 are front and rear isometric views of a first embodiment of a coupling 5 of the present invention. The coupling 5 comprises a body member 10 having a first end 11, a second end 12, and a third end 13. The coupling 5 comprises a plurality of apertures 20 shown as a first aperture 21, a second aperture 22, and a third aperture 23.

A plurality of bores 30 comprising a first or primary bore 31 and a second or secondary bore 32 are defined within the coupling 5. The first and second apertures 21 and 22 are interconnected by the primary bore 31. The secondary bore 32 is interconnected to the primary bore 31.

A plurality of tubes shown as a first tube 40, a second tube 50 and a third tube 60 are connected to the coupling 5. The first tube 40 comprises a first end 41 and a second end 42. The first tube 40 is defined by an outer surface 43 and an inner bore 45. Preferably, the first tube 40 is formed from a flexible polymeric material. In one example, the first tube 40 is formed with a thermoplastic elastomeric material.

The second tube 50 comprises a first end 51 and a second end 52. The second tube 50 is defined by an outer surface 53 and an inner bore 55. The third tube 60 comprises a first end 61 and a second end 62. The third tube 60 is defined by an outer surface 63 and an inner bore 65. Preferably, the second tube 50 and the third tube 60 are formed of the same material as the first tube 40.

In this example, the third tube 70 is shown disposed at an angle relative to said first tube 40. More specifically, the third tube 70 is disposed at a perpendicular angle relative to the first and the second tube 40 and 50 to form a T-shape interconnection of the first, second and third tubes 40, 50 and 70.

Figures 3, 4, 5:
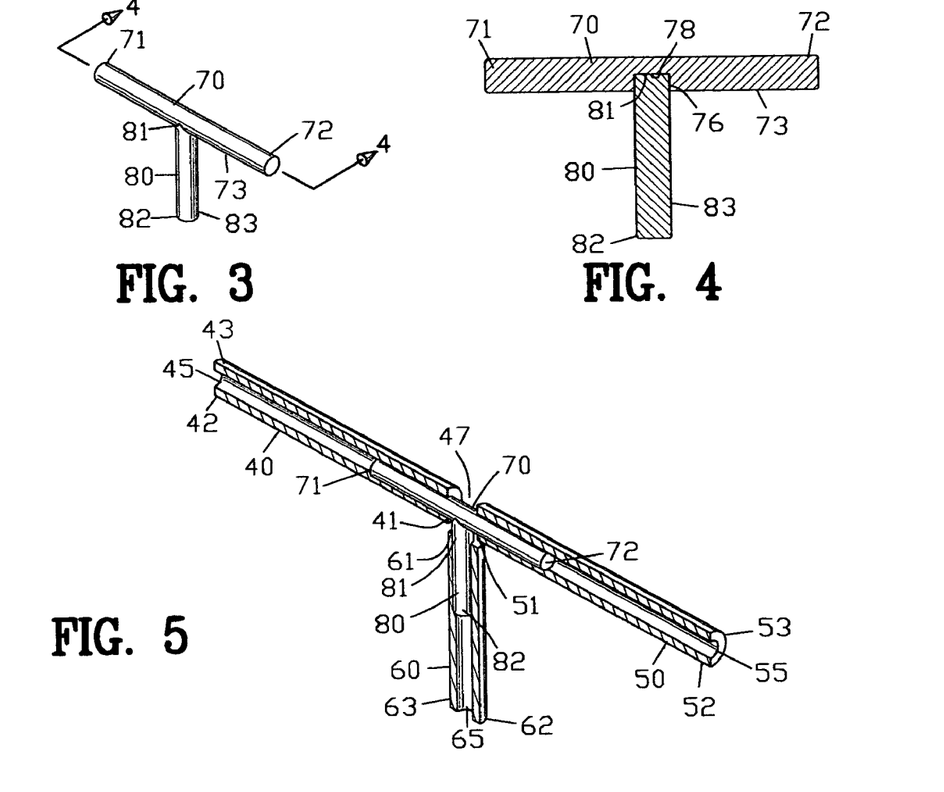
FIG. 3 is an isometric view of a primary and secondary core pin for forming the coupling of FIGS. 1 and 2.
FIG. 4 is an enlarged sectional view along lines 4-4 in FIG. 3.
FIG. 5 is an isometric sectional view of the primary and secondary core pin inserted within a first, second and a third tubing.

FIG. 3 is an isometric view of a primary core pin 70 and a secondary core pin 80. The primary core pin 70 extends between a first end 71 and a second end 72. The primary core pin 70 is defined by an outer cylindrical surface 73. Preferably, the primary core pin 70 is formed from a rigid material. The primary core pin 70 includes a mating aperture 76 terminating in an end wall 78.

The secondary core pin 80 extends between a first end 81 and a second end 82. The secondary core pin 80 is defined by an outer cylindrical surface 83. Preferably, the secondary core pin 80 is formed from a rigid material.

FIG. 4 is an enlarged sectional view along lines 4-4 in FIG. 3 illustrating the secondary core pin 80 is shown abutting to engage with the primary core pin 70. The outer cylindrical surface 83 of the secondary core pin 80 is slidably received in the mating aperture 76 of the primary core pin 70.

FIG. 5 is an isometric sectional view of the primary and secondary core pin 70 and 80 inserted within the first tubing 40, the second tubing 50 and the third tubing 60. The first end 61 of the third tube 60 is inserted over the second end 82 of the secondary core pin 80 until the first end 61 of the third tube 60 is spaced from the outer surface 73 of the primary core pin 70. In this example, the first end 61 of the third tube 60 is spaced from the outer surface 73 of the primary core pin 70 a distance of approximately two wall thicknesses of the first tubing 40.

The first end 41 of the first tube 40 is inserted over the first end 71 of the primary core pin 70 until the first end 41 of the first tube 40 is spaced from the outer surface 63 of the third tube 60. Preferably, the first end 41 of the first tube 40 is spaced from the from the outer surface 63 of the third tube 60 a distance of approximately one wall thicknesses of the first tubing 40.

The first end 51 of the second tube 50 is inserted over the second end 72 of the primary core pin 70 until the first end 51 of the second tube 50 is spaced from the outer surface 63 of the third tube 60. Preferably, the first end 51 of the second tube 50 is spaced from the from the outer surface 63 of the third tube 60 a distance of approximately one wall thicknesses of the second tubing 50. A space 48 is defined between the first end 41 of the first tube 40 and the first end 51 of the second tube 50.

Figure 6:
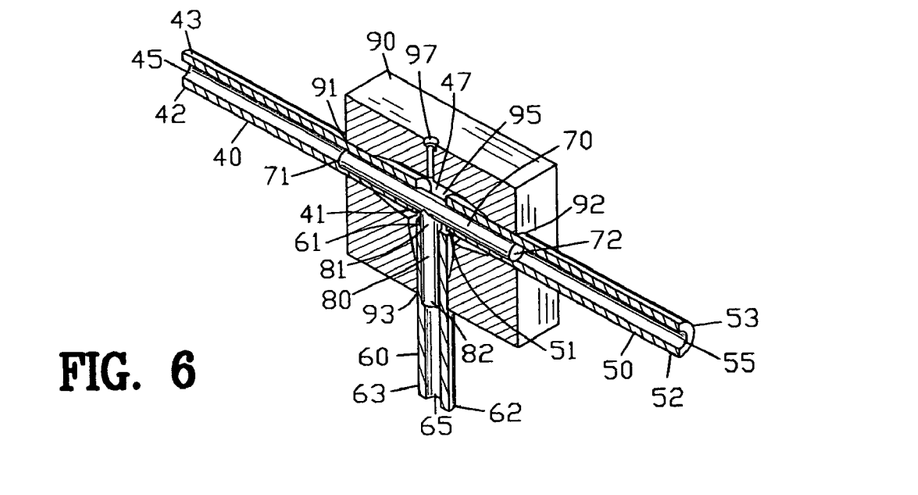
FIG. 6 illustrates the primary and secondary core pins and the first, second and third tubings located within a mold cavity.

FIG. 6 illustrates the first tubing 40, the second tubing 50 and the third tubing 60 located within a mold 90. The mold 90 includes a first mold aperture 91, a second mold aperture 92 and a third mold aperture 93 extend to a mold cavity 95. A mold orifice 97 communicates with the mold cavity 95.

The first, second and third tubes 40, 50 and 60 extend through the first, second and third mold apertures 91-93 of the mold 90. The first ends 41, 51 and 61 of the first, second and third tubes 40, 50 and 60 are positioned on the primary and secondary core pins 70 and 80 within the mold cavity 95. A thermoplastic material 100 is injected into the mold cavity 95 for forming the coupling body 10 of the coupling 5. The thermoplastic material 100 fills the entire occupied volumes of the mold cavity 95 including the space 48 between the first end 41 of the first tube 40 and the first end 51 of the second tube 50 as well as the spaces defined at the first ends 41, 51 and 61 of the first, second and third tubes 40, 50 and 60.

In one example, the injected thermoplastic material 100 is an injected thermoplastic elastomer.

Figure 7:
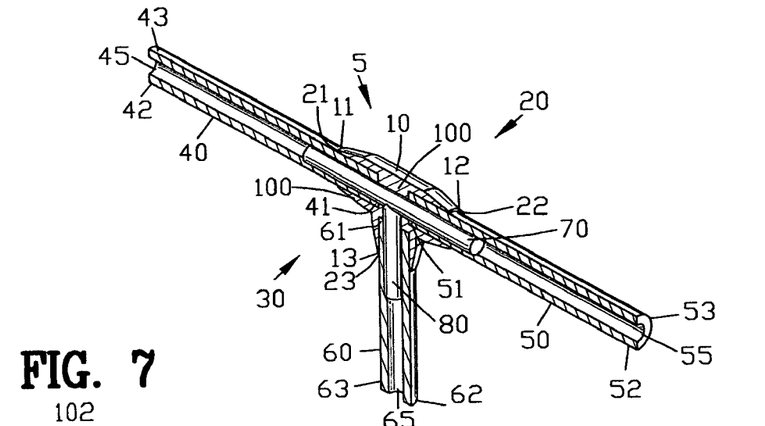
FIG. 7 is an isometric view illustrating the formed coupling with the primary and secondary core pins located therein.

FIG. 7 is an isometric view illustrating the formed coupling 5 removed from the mold cavity 95. The coupling body 10 interconnects the first, second and third tubes 40, 50 and 60. The thermoplastic material 100 forms a smooth interconnection of the inner bores 45 and 55 of the first and second tubes 40 and 50. The thermoplastic material 100 fills the space 48 to bond the first end 41 of the first tube 40 to the first end 51 of the second tube 50. The primary and secondary core pins 70 and 80 are located within the coupling body 10 and the first, second and third tubes 40, 50 and 60.

Figure 8:
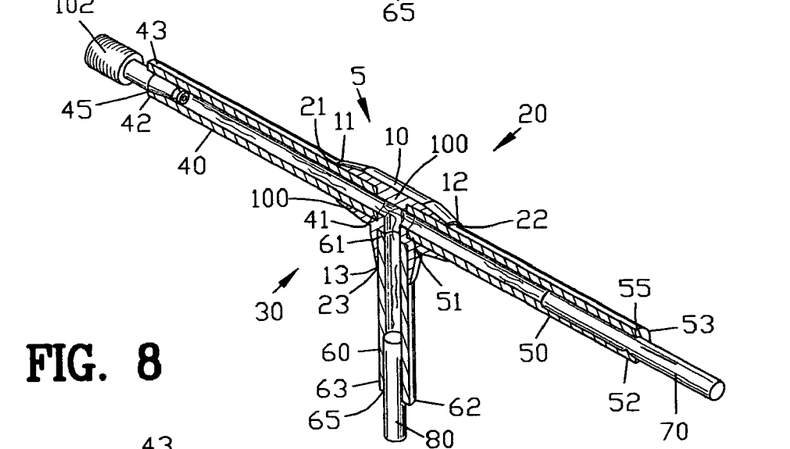
FIG. 8 illustrates the disengagement of being secondary core pin from the primary core and the removal of the primary and secondary core pins from the first, second and third tubes.

FIG. 8 illustrates the disengagement of the secondary core pin 80 from the primary core 70 and the removal of the primary and secondary core pins 70 and 80 from the first, second and third tubes 40, 50 and 60.

The secondary core pin 80 is disengaged from the mating aperture 76 in the primary core pin 70. In one example, the secondary core pin 80 is disengaged from the mating aperture 76 by orienting the secondary core pin 80 to disengage from the mating aperture 76 by action of gravity. In still another example, the secondary core pin 80 is disengaged from the mating aperture 76 by mechanically extracting the secondary core pin 80 through the third tube 60.

After the secondary core pin 80 is disengaged from the mating aperture 76 in the primary core pin 70, the primary and secondary core pins 70 and 80 are removed from the tubes 40, 50 and 60. A nozzle 102 is connected to one of the first and second tubes 40 and 50 for applying air pressure to force the primary core pin 70 from the first and second tubes 40 and 50. After the primary core pin 70 passes the first end 61 of the third tube 60, the secondary core pin 80 is removed from the third tube 60. The secondary core pin 80 may be removed mechanically or pneumatically from the third tube 60. Preferably, the secondary core pin 80 is removed from the third tube 60 by air pressure forcing the secondary core pin 80 from the third tube 60.

Figure 9:
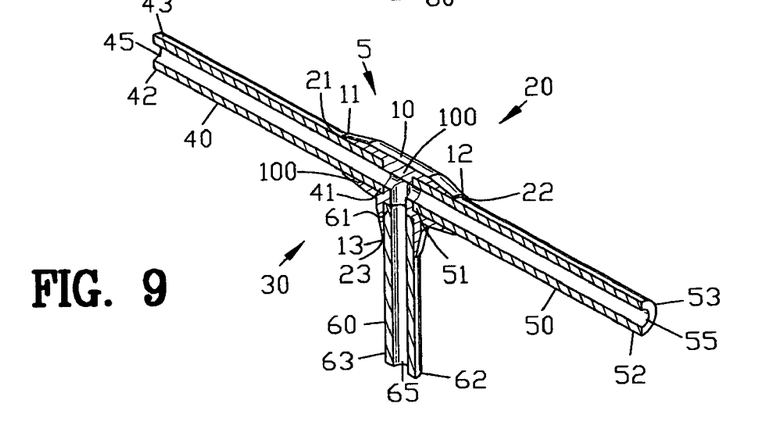
FIG. 9 is an isometric view of the completed coupling shown in FIGS. 1 and 2.

FIG. 9 is an isometric view of the completed coupling 5 shown in FIGS. 1 and 2. The improved process of the present invention provides a coupling body 10 interconnecting the first, second and third tubes 40, 50 and 60. The thermoplastic material 100 forms a smooth interconnection of the inner bores 43 and 53 of the first and second tubes 40 and 50. The thermoplastic material 100 forms a smooth interconnection of the inner bores 43 and 53 of the first and second tubes 40 and 50 with the inner bore 63 of the third tube 60.

Figure 10:
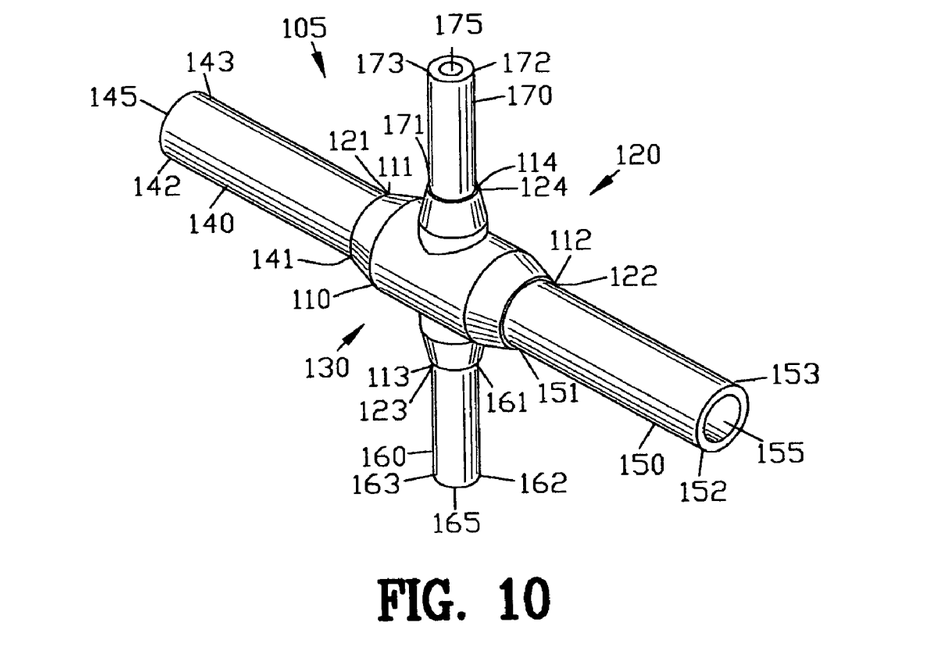
FIG. 10 is a front isometric view of a second embodiment of a coupling of the present invention
Figure 11:
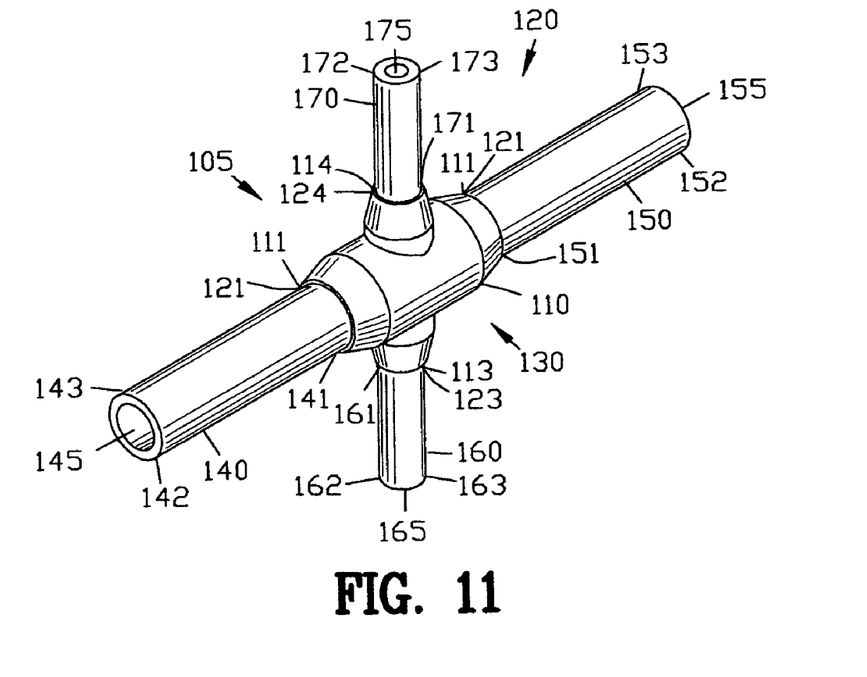
FIG. 11 is a rear isometric view of the coupling of FIG. 10.

FIGS. 10 and 11 are front and rear isometric views of a second embodiment of a coupling 105 of the present invention. The coupling 105 comprises a body member 110 having a first end 111, a second end 112, a third end 113, and a fourth end 114. The coupling 105 comprises a plurality of apertures 120 shown as a first aperture 121, a second aperture 122, a third aperture 123 and a fourth aperture 124.

A plurality of bores 130 comprising a first or primary bore 131 and a second or secondary bore 132 are defined within the coupling 105. The first and second apertures 121 and 122 are interconnected by the primary bore 131. The third and fourth apertures 123 and 124 are interconnected by the secondary bore 132 through the primary bore 131.

A plurality of tubes shown as a first tube 140, a second tube 150, a third tube 160 and a fourth tube 170 are connected to the coupling 105. The first tube 140 comprises a first end 141 and a second end 142. The first tube 140 is defined by an outer surface 143 and an inner bore 145. The first tube 140 is formed from a flexible polymeric material.

The second tube 150 comprises a first end 151 and a second end 152. The second tube 150 is defined by an outer surface 153 and an inner bore 155. The third tube 160 comprises a first end 161 and a second end 162. The third tube 160 is defined by an outer surface 163 and an inner bore 165. The fourth tube 170 comprises a first end 171 and a second end 172. The third tube 170 is defined by an outer surface 173 and an inner bore 175.

The third tube 160 and the fourth tube 170 are disposed at a perpendicular angle relative to the first and the second tube 140 and 150 to form a X-shape interconnection of the first, second, third and fourth tubes 140, 150, 160 and 170.

Figure 12:
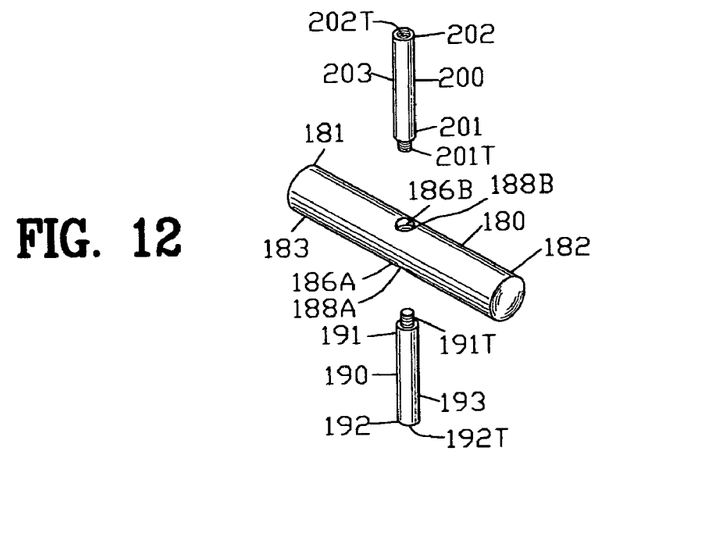
FIG. 12 is an isometric unassembled view of a primary and plural secondary core pins for forming the coupling of FIGS. 10 and 11.

FIG. 12 is an unassembled isometric view of a primary core pin 180 and first and a second secondary core pins 190 and 200. The primary core pin 180 extends between a first end 181 and a second end 182. The primary core pin 180 is defined by an outer cylindrical surface 183. The primary core pin 180 includes a first threaded mating aperture 186A terminating in an end wall 188A. The primary core pin 180 includes a second threaded mating aperture 186B terminating in an end wall 188B.

The first secondary core pin 190 extends between a first end 191 and a second threaded end 192. The first secondary core pin 190 is defined by an outer cylindrical surface 193. The first end 191 of the first secondary core pin 190 includes a threaded stud 191T. The second end 192 of the first secondary core pin 190 includes a threaded bore 192T.

The threads of the threaded stud 191T are adapted to threadably engage with the first threaded mating aperture 186A of the primary core pin 180. The threads of the threaded stud 191T extend in a direction opposite to the threads defined in the threaded bore 192T.

The second secondary core pin 200 extends between a first threaded end 201 and a second threaded end 202. The first secondary core pin 200 is defined by an outer cylindrical surface 203. The threads of the threaded stud 201T are adapted to threadably engage with the second threaded mating aperture 186B of the primary core pin 180. The threads of the threaded stud 201T extend in a direction opposite to the threads defined in the threaded bore 202T.

Figure 13:
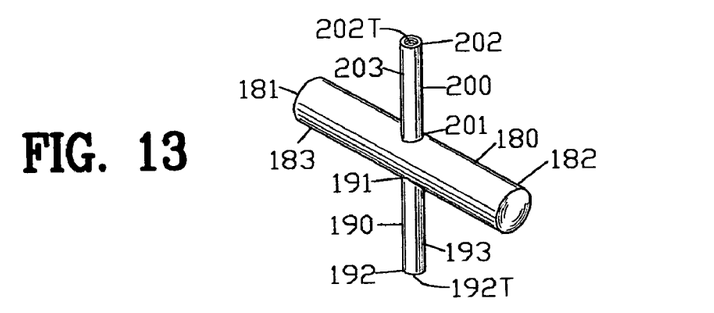
FIG. 13 is an isometric assembled view of the primary and plural secondary core pins of FIG. 12.
Figure 14:
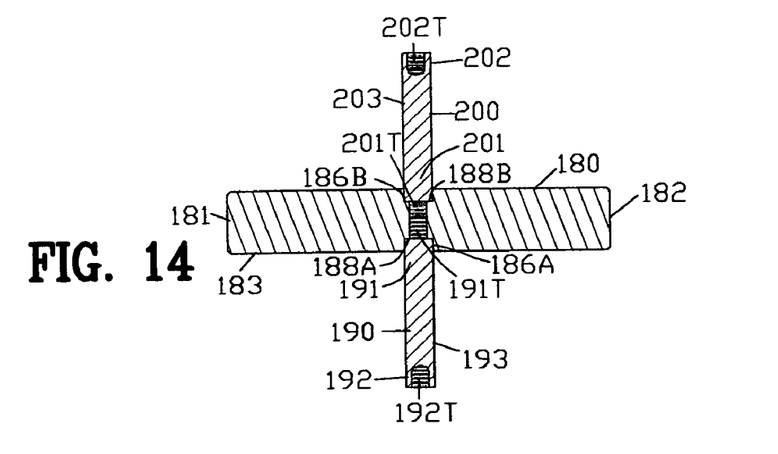
FIG. 14 is a sectional view along lines 13-13 in FIG. 13.

FIGS. 13 and 14 are assembled view of the primary core pin 180 and first and second secondary core pins 190 and 200 of FIG. 12. The threads of the threaded stud 191T are threadably engaged with the first threaded mating aperture 186A of the primary core pin 180. The threads of the threaded stud 201T are threadably engaged with the second threaded mating aperture 186B of the primary core pin 180.

Figure 15:
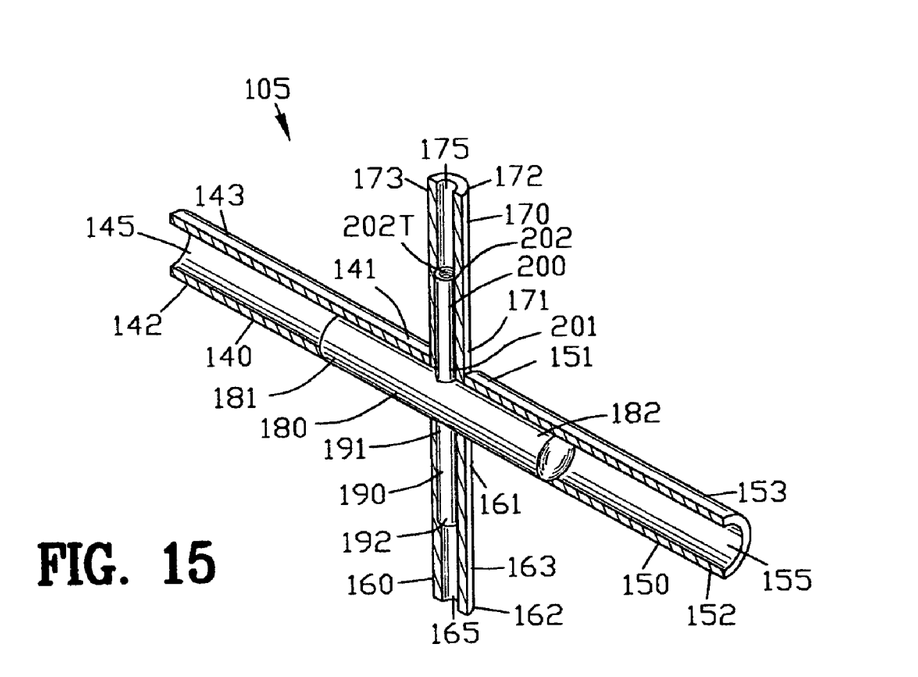
FIG. 15 is an isometric sectional view of the primary and plural secondary core pins inserted within a first through fourth tubing.

FIG. 15 is an isometric sectional view of the primary core pin 180 and the first and second secondary core pins 190 and 200 inserted within the first tubing 140, the second tubing 150, the third tubing 160 and the fourth tubing 170. The first end 161 of the third tube 160 is inserted over the second end 192 of the first secondary core pin 190 until the first end 161 of the third tube 160 engages with the outer surface 183 of the primary core pin 180. The first end 171 of the fourth tube 170 is inserted over the second end 202 of the second secondary core pin 200 until the first end 171 of the fourth tube 170 engages with the outer surface 183 of the primary core pin 180.

The first end 141 of the first tube 140 is inserted over the first end 181 of the primary core pin 180 until the first end 141 of the first tube 140 engages with the outer surfaces 193 and 203 of the third and fourth tubes 160 and 170. The first end 151 of the second tube 150 is inserted over the second end 182 of the primary core pin 180 until the first end 151 of the second tube 150 engages with the outer surfaces 193 and 203 of the third and fourth tubes 160 and 170.

Figure 16:
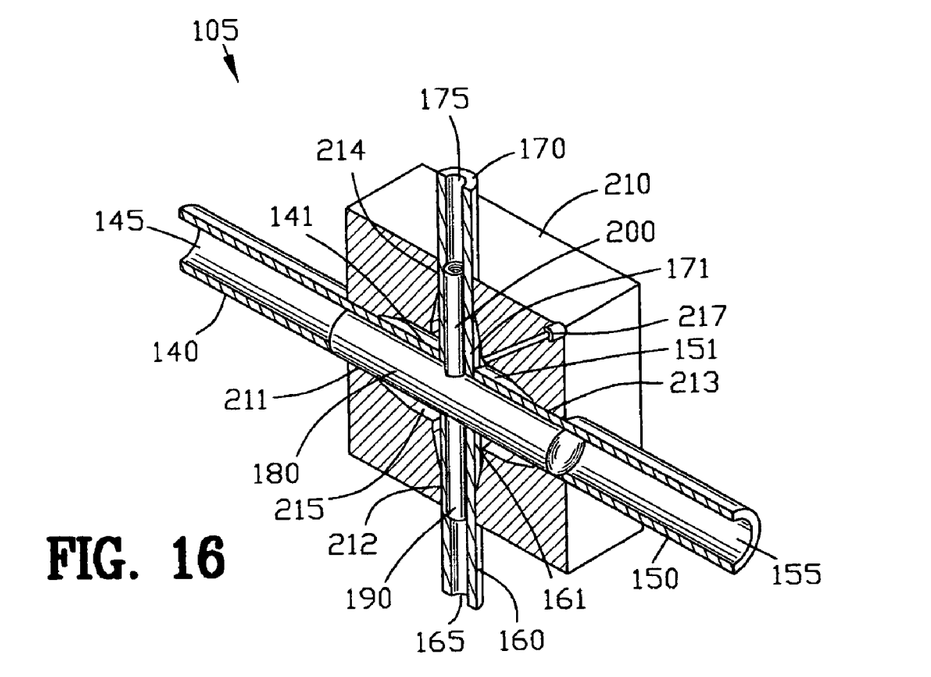
FIG. 16 illustrates the primary and plural secondary core pins and the first through fourth tubings located within a mold cavity.

FIG. 16 illustrates the first tubing 140, the second tubing 150, the third tubing 160 and the fourth tubing 170 located within a mold 210. The mold 210 includes a first mold aperture 211, a second mold aperture 212, a third mold aperture 213 and a fourth mold aperture 214 extending to a mold cavity 215. A mold orifice 217 communicates with the mold cavity 215.

The first, second, third and fourth tubes 140, 150, 160 and 170 extend through the first, second, third and fourth mold apertures 211-214 of the mold 210. The first ends 141, 151, 161 and 171 of the first, second, third and fourth tubes 140, 150, 160 and 170 are positioned on the primary and secondary core pins 180 and 190 within the mold cavity 215. A thermoplastic material 220 is injected into the mold cavity 215 for forming the coupling body 110 of the coupling 105.

Figure 17:
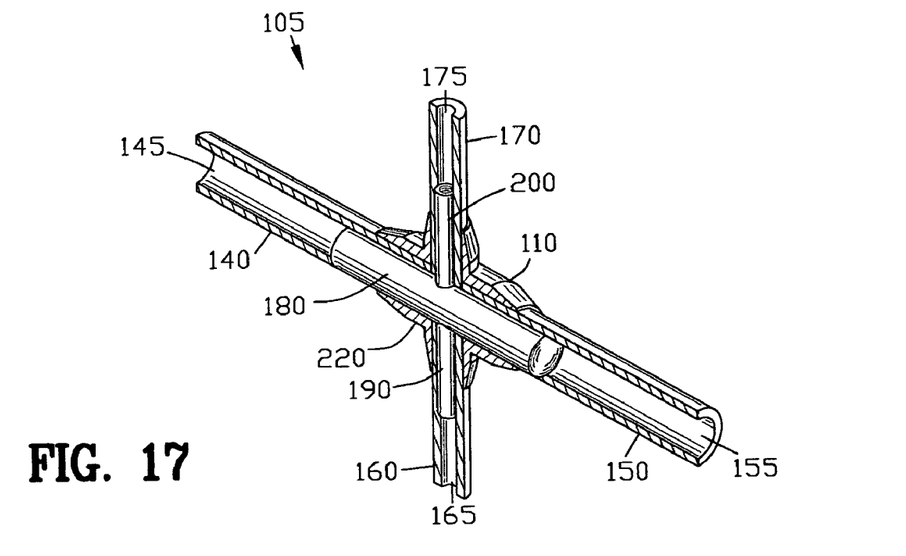
FIG. 17 is an isometric view illustrating the formed coupling with the primary and plural secondary core pins located therein.

FIG. 17 is an isometric view illustrating the formed coupling 105 removed from the mold cavity 215. The coupling body 110 interconnects the first, second, third and fourth tubes 140, 150, 160 and 170. The thermoplastic material 220 forms a smooth interconnection of the inner bores 145 and 155 of the first and second tubes 140 and 150. The primary core pin 180 and first and second secondary core pins 190 and 200 are located within the coupling body 110 and the first, second, third and fourth tubes 140, 150, 160 and 170.

Figure 18:
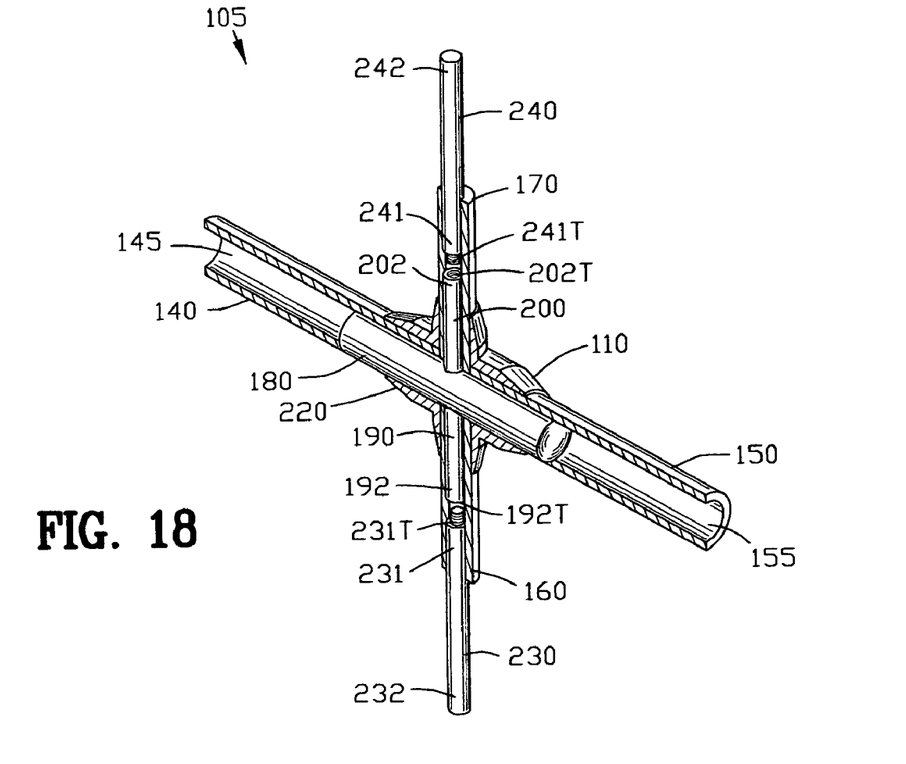
FIG. 18 illustrates the threaded engagement of plural extractors with the plural secondary core pins for threadably disengaging the plural secondary core pins from the primary core pin.

FIG. 18 illustrates the insertion of a first and a second extractor 230 and 240 into the third and fourth tubings 160 and 170 for extracting the first and second secondary core pins 190 and 200. The first extractor 230 extends between a first end 231 and a second end 232. The first end 231 of the first extractor 230 includes a threaded stud 231T. The threaded stud 231T of the first extractor 230 is adapted to threadably engage with the threaded bore 192T on the second end 192 of the first secondary core pin 190.

The threaded engagement of the first threaded mating aperture 186A of the primary core pin 180 with the threaded stud 191T of the first secondary core pin 190 extends in a first direction. The threaded engagement of the threaded bore 192T of the first secondary core pin 190 with the threaded stud 231T of the first extractor 230 extends in a second and opposite direction.

The second extractor 240 extends between a first end 241 and a second end 242. The first end 241 of the second extractor 240 includes a threaded stud 241T. The threaded stud 241T of the second extractor 240 is adapted to threadably engage with the threaded bore 202T on the second end 202 of the second secondary core pin 200.

The threaded engagement of the second threaded mating aperture 186B of the primary core pin 180 with the threaded stud 201T of the second secondary core pin 200 extends in a first direction. The threaded engagement of the threaded bore 202T of the second secondary core pin 200 with the threaded stud 241T of the second extractor 240 extends in a second and opposite direction.

Figure 19:
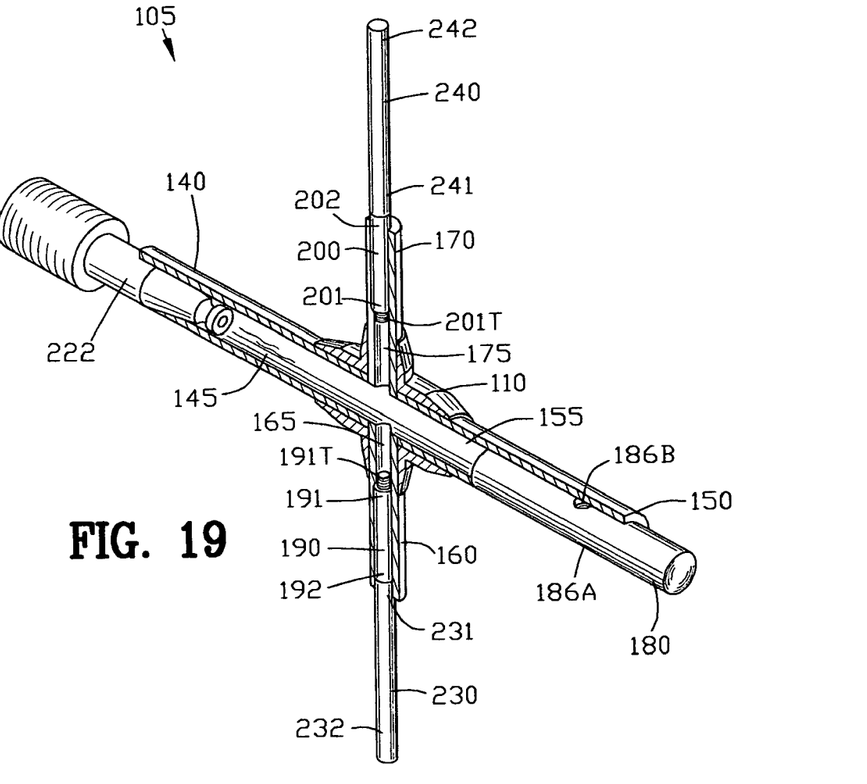
FIG. 19 illustrates the removal of the primary and plural secondary core pins from the first through fourth tubings.

FIG. 19 illustrates the removal of the primary core pin 189 and the first and second secondary core pins 190 and 200. The first and second extractors 230 and 240 are inserted through the third and fourth tubings 160 and 170 for threadably engaging with the first and second secondary core pins 190 and 200.

The opposite direction of the threaded engagement of the first threaded mating aperture 186A with the threaded stud 191T from the threaded engagement of the threaded bore 192T with the threaded stud 231T enables the rotation of the first extractor 230 to threadably remove the first secondary core pin 190 from the first threaded mating aperture 186A of the primary core pin 180.

In a similar manner, the opposite direction of the threaded engagement of the second threaded mating aperture 186B with the threaded stud 201T from the threaded engagement of the threaded bore 202T with the threaded stud 241T enables the rotation of the second extractor 240 to threadably remove the second secondary core pin 200 from the second threaded mating aperture 186B of the primary core pin 180.

After the first and second secondary core pin 190 and 200 are mechanically extracted, the primary core pin 180 is removed from the tubes 140 and 150. A nozzle 222 is connected to one of the first and second tubes 140 and 150 for applying air pressure to force the primary core pin 180 from the first and second tubes 140 and 150.

Figure 20:
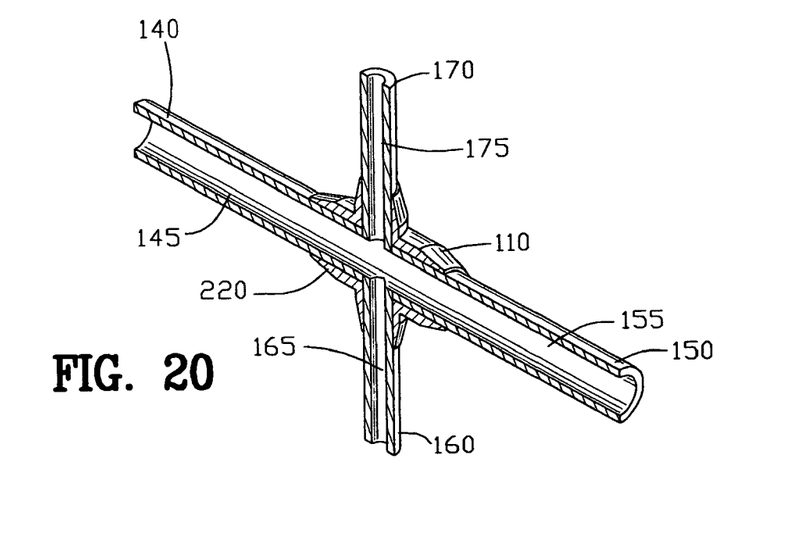
FIG. 20 is an isometric view of the completed coupling shown in FIGS. 10 and 11.

FIG. 20 is an isometric view of the completed coupling 105 shown in FIGS. 10 and 11. The improved process of the present invention provides a coupling body 110 interconnecting the first, second, third and fourth tubes 140, 150, 160 and 170. The thermoplastic material 220 forms a smooth interconnection of the inner bores 145 and 155 of the first and second tubes 140 and 150. The thermoplastic material 220 forms a smooth interconnection of the inner bores 145 and 155 of the first and second tubes 140 and 150 with the inner bore 165 and 175 of the third and fourth tubes 160 and 170.

Figure 21:
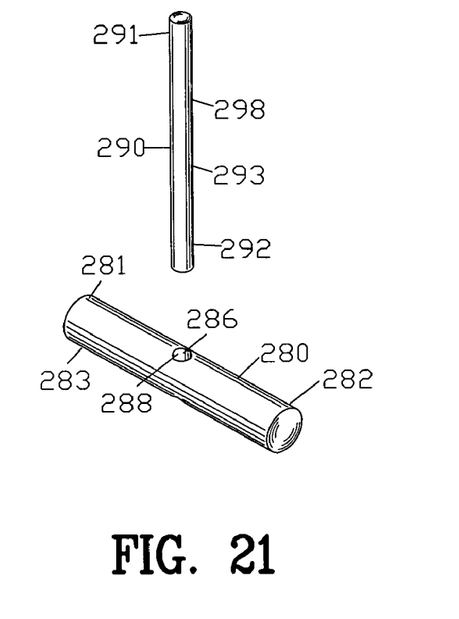
FIG. 21 is an unassembled isometric view of an alternate embodiment of a primary core pin and a secondary core pin suitable for use with the present invention.

FIG. 21 is an unassembled isometric view of an alternate embodiment of a primary core pin 280 and a secondary core pin 290 suitable for use with the present invention. The primary core pin 280 extends between a first end 281 and a second end 282. The primary core pin 280 is defined by an outer cylindrical surface 283. The primary core pin 280 includes a through aperture 286 having an inner diameter 288.

The secondary core pin 290 extends between a first end 291 and a second end 292. The secondary core pin 290 is defined by an outer cylindrical surface 293. The outer cylindrical surface 293 of the secondary core pin 290 has an outer diameter 298 commensurate with the inner diameter 288 of the aperture 286 of the primary core pin 280.

Figure 22:
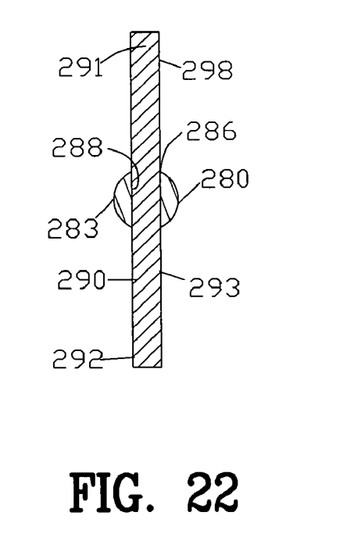
FIG. 22 is a sectional view of the assembled primary core pin and the secondary core pin of FIG. 21.

FIG. 22 is a sectional view of the assembled primary core pin 280 and the secondary core pin 290. The secondary core pin 290 is slidingly received within the through aperture 286 of the primary core pin 280. The sliding fit between the secondary core pin 290 and the through aperture 286 of the primary core pin 280 enables the secondary core pin 290 to be readily inserted and removed from the primary core pin 280 while inhibiting any thermoplastic material from entering the aperture 286 of the primary core pin 280.

Figure 23:
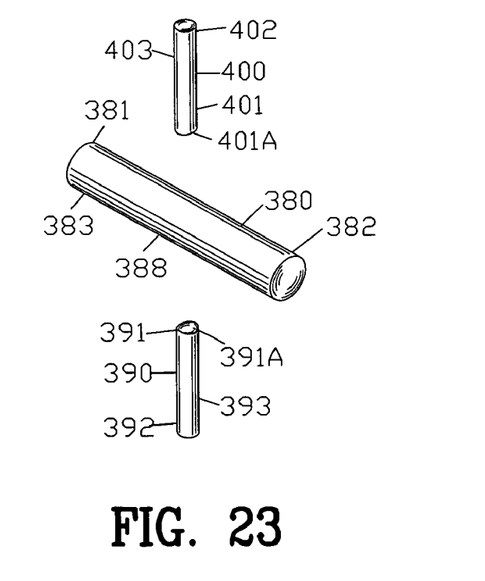
FIG. 23 is an unassembled isometric view of a further alternate embodiment of a primary core pin and a first and a second secondary core pins suitable for use with the present invention.

FIG. 23 is an unassembled isometric view of a further alternate embodiment of a primary core pin 380 and a first and a second secondary core pin 390 and 400 suitable for use with the present invention. The primary core pin 380 extends between a first end 381 and a second end 382. The primary core pin 380 is defined by an outer cylindrical surface 383 having an outer diameter 388.

The first secondary core pin 390 extends between a first end 391 and a second end 392. The first end 391 of the first secondary core pin 390 terminates in an arcuate surface 391A. The arcuate surface 391A has a diameter commensurate with the outer diameter 388 of the outer cylindrical surface 383 of the primary core pin 380.

The second secondary core pin 400 extends between a first end 401 and a second end 402. The first end 401 of the second secondary core pin 400 terminates in an arcuate surface 401A. The arcuate surface 401A has a diameter commensurate with the outer diameter 388 of the outer cylindrical surface 383 of the primary core pin 380.

Figure 24:
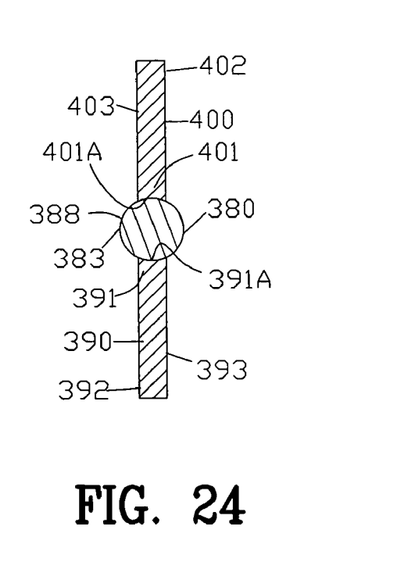
FIG. 24 is a sectional view of the assembled primary core pin and the first and second secondary core pins of FIG. 23.

FIG. 24 is a sectional view of the assembled primary core pin 380 and the first and second secondary core pins 390 and 400. The arcuate surface 391A of the first end 391 of the first secondary core pin 390 engages with the outer cylindrical surface 383 of the primary core pin 380. In a similar manner, the arcuate surface 401A of the first end 401 of the second secondary core pin 400 engages with the outer cylindrical surface 383 of the primary core pin 380.

The mating fit between the arcuate surfaces 3901A and 401A and the outer cylindrical surface 383 enables the first and second secondary core pins 390 and 400 to be readily engaged with and removed from the primary core pin 380 while inhibiting any thermoplastic material from entering between the arcuate surfaces 3901A and 401A and the outer cylindrical surface 383. In addition, the mating fit between the arcuate surfaces 3901A and 401A and the outer cylindrical surface 383 enables the first and second secondary core pins 390 and 400 to be disposed at various angles about the primary core pin 380.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A process of molding a coupling for interconnecting a primary tube and a secondary tube, comprising the steps of:
   inserting a primary core pin into an end of the primary tube,
   inserting a secondary core pin into an end of the second tube to abut with the primary core pin at an intersection, wherein the first and second tubes are spaced apart from the intersection;
   inserting the primary and secondary tubes and the primary and secondary core pins into a mold cavity such that the intersection is exposed to the mold cavity;
   injecting a thermoplastic material into the mold cavity to form the coupling interconnecting the secondary and second tubes, wherein injecting the thermoplastic material is performed such that the thermoplastic material contacts the primary and secondary core pins at the intersection;

removing the coupling and the tubes from the mold cavity;

disengaging the secondary core pin from the primary core pin;

removing the secondary core pin from the secondary tube; and removing the primary core pin from the primary tube.

2. A process of molding a coupling as set forth in claim 1, wherein the step of disengaging the secondary core pin includes orienting the secondary core pin to disengage the secondary core pin from a mating aperture of the primary core pin by action of gravity.

3. A process of molding a coupling as set forth in claim 1, wherein the step of disengaging the secondary core pin includes orienting the secondary core pin to disengage the secondary core pin from a mating aperture of the primary core pin by action of vibration.

4. A process of molding a coupling as set forth in claim 1, wherein the step of disengaging the secondary core pin includes mechanically extracting the secondary core pin through the secondary tube.

5. A process of molding a coupling as set forth in claim 1, wherein the step of removing the secondary core pin includes forcing the secondary core pin through the secondary tube by air pressure.

6. A process of molding a coupling as set forth in claim 1, wherein the step of removing the primary core pin includes forcing the primary core pin through the primary tube by air pressure.

7. A process of molding a coupling as set forth in claim 1, wherein:
the primary tube and the secondary tubes define inner cross-sections; and
the step of injecting a thermoplastic material into the mold includes injecting a thermoplastic material to form a smooth interconnection of the inner cross-sections of the primary tube and the secondary tubes.

8. A process of molding a coupling as set forth in claim 1, wherein the step of injecting a thermoplastic material includes injecting a thermoplastic elastomer into the mold cavity.

9. A process of molding a coupling for interconnecting a first tube, a second tube, and a third tube, comprising the steps of
inserting a primary core pin into ends of the first and the second tubes;
inserting a secondary core pin into an end of the third tube;
inserting the secondary core pin into an aperture in the primary core pin at an intersection, wherein the first, second, and third tubes are spaced apart from the intersection;
inserting the first, second, and third tubes and the primary and secondary core pins into a mold cavity such that the intersection is exposed to the mold cavity;
injecting a thermoplastic material into the mold cavity to form the coupling interconnecting the first, second, and third tubes, wherein injecting the thermoplastic material is performed such that the thermoplastic material contacts the primary and secondary core pins at the intersection;

removing the coupling and the first, second and third tubes from the mold cavity;

disengaging the secondary core pin from a mating aperture in the primary core pin;

removing the secondary core pin by passing the secondary core pin through the third tube; and removing the primary core pin by passing the primary core pin through one of the first and second tubes.

10. A process of molding a coupling as set forth in claim 9, wherein the third tube is disposed at a perpendicular angle relative to said first tube.

11. A process of molding a coupling as set forth in claim 9, wherein the third tube is disposed at a perpendicular angle relative to the first and the second tube to form a T-shape interconnection of the first, second and third tubes.

12. A process of molding a coupling as set forth in claim 9, wherein the step of inserting a primary core pin includes:
inserting a first end of the primary core pin into the first tube; and
inserting a second end of the first primary core pin into the second tube.

13. A process of molding a coupling as set forth in claim 9, wherein the step of disengaging the secondary core pin includes orienting the secondary core pin to disengage the secondary core pin from the mating aperture by action of gravity.

14. A process of molding a coupling as set forth in claim 9, wherein the step of disengaging the secondary core pin includes orienting the secondary core pin to disengage the secondary core pin from the mating aperture by action of vibration.

15. A process of molding a coupling as set forth in claim 9, wherein the step of disengaging the secondary core pin includes mechanically extracting the secondary core pin through the third tube.

16. A process of molding a coupling as set forth in claim 9, wherein the step of removing the secondary core pin includes forcing the secondary core pin through the third tube by air pressure.

17. A process of molding a coupling as set forth in claim 9, wherein the step of removing the primary core pin includes forcing the primary core pin through one of the first and second tubes by air pressure.

18. A process of molding a coupling as set forth in claim 1, wherein when inserting the primary and secondary tubes and the primary and secondary core pins into a mold cavity, the primary and secondary tubes are spaced apart by a distance of approximately one wall thickness of the primary tube.

19. A process of molding a coupling, as set forth in claim 9, wherein when inserting the first, second, and third tubes and the primary and secondary core pins into a mold cavity, the first and second tubes are spaced apart by a distance of approximately one wall thickness of the first tube.

* * * * *